(12) United States Patent
Nakajima (10) Patent No.: US 7,817,901 B2
(45) Date of Patent: Oct. 19, 2010

(54) RECORDING AND REPRODUCING APPARATUS

(75) Inventor: Hirofumi Nakajima, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1079 days.

(21) Appl. No.: 11/300,265

(22) Filed: Dec. 14, 2005

(65) Prior Publication Data

US 2006/0133772 A1 Jun. 22, 2006

(30) Foreign Application Priority Data

Dec. 21, 2004 (JP) ............................. 2004-369428

(51) Int. Cl.
| | |
|---|---|
| H04N 5/91 | (2006.01) |
| H04N 7/00 | (2006.01) |
| H04N 7/26 | (2006.01) |
| H04N 7/64 | (2006.01) |
| G06K 9/46 | (2006.01) |
| G11B 5/02 | (2006.01) |
| G11B 5/09 | (2006.01) |
| G11B 5/58 | (2006.01) |
| G11B 15/14 | (2006.01) |
| G11B 15/48 | (2006.01) |
| G11B 19/02 | (2006.01) |

(52) U.S. Cl. ............................. 386/68; 386/46; 386/69; 386/98; 386/111; 386/116; 360/32; 360/48; 360/57; 360/64; 360/69; 360/72.1; 360/72.2; 360/74.2; 360/74.4; 360/77.15; 382/236

(58) Field of Classification Search ................... 386/68, 386/46, 69, 96, 98, 111, 112, 116, E5.045, 386/E9.009, E9.013, E9.015; 360/32, 48, 360/57, 64, 72.1, 72.2, 74.2, 74.4, 77.15, 360/69; 375/E7.094, E7.148, E7.15, E7.163, 375/E7.171, E7.211, E7.224, E7.256; 382/236; G9B/5.015, 5.018, 5.026, 5.033, 5.177, 15.002, G9B/15.004, 15.007, 15.017, 15.03, 20.021, G9B/20.049, 27.002, 27.003, 27.026, 27.033, G9B/27.051

See application file for complete search history.

(56) References Cited

U.S. PATENT DOCUMENTS

| | | | | |
|---|---|---|---|---|
| 4,320,423 A | * | 3/1982 | Frey et al. | 360/72.2 |
| 4,542,427 A | * | 9/1985 | Nagai | 360/72.1 |
| 5,296,976 A | * | 3/1994 | Takayama et al. | 360/57 |
| 5,335,117 A | * | 8/1994 | Park et al. | 360/48 |
| 5,933,534 A | * | 8/1999 | Yoshimoto et al. | 382/236 |
| 6,263,151 B1 | * | 7/2001 | Nishijima et al. | 386/68 |
| 2001/0051036 A1 | * | 12/2001 | Suzuki | 386/68 |
| 2002/0003947 A1 | * | 1/2002 | Abe et al. | 386/96 |
| 2004/0091247 A1 | | 5/2004 | Shimomura et al. | |

FOREIGN PATENT DOCUMENTS

JP 2004-164731 A 6/2004

* cited by examiner

*Primary Examiner*—Thai Tran
*Assistant Examiner*—Syed Y Hasan
(74) *Attorney, Agent, or Firm*—Canon USA Inc IP Div (57) ABSTRACT

A recording and reproducing apparatus including a reproduction unit configured to reproduce information data, which is error-correcting-coded for every N tracks, from a recording medium, wherein the information data includes moving image data which is variable-length-encoded, a recording unit configured to record moving image data on the recording medium, a detection unit configured to detect additional information from the information data reproduced by the reproduction unit, wherein the additional information indicates that the editing point, which can be set up for every frame of a predetermined number, is contained in the moving image data recorded in the N tracks, and a controller configured to control the reproduction unit to reproduce the information data by transporting the recording medium at a high-speed faster than a normal reproduction speed.

6 Claims, 7 Drawing Sheets

RECORDING AND REPRODUCING APPARATUS

BACKGROUND OF THE INVENTION

1. Field of the Invention

The present invention relates to a recording and reproducing apparatus, and in particular, relates to an apparatus for recording and reproducing image data on and from a recording medium.

2. Description of the Related Art

Conventionally, a VTR (video tape recorder) which records an image signal or an audio signal encoded by MPEG (Moving Picture Experts Group) method is known.

For example, in Japanese Patent Laid-Open No. 2004-164731 (foreign counterpart United States Patent Publication No. 2004/0091247), an apparatus which performs error-correcting-code process with data corresponding to N tracks as one unit (hereinafter referred to as "ECC (error correcting code) unit") and records the error-correcting-code processed data is described. Also, three frames are made into an editing unit. Header information which indicates whether a head position (hereinafter referred to as "editing point") of the editing unit is included in the ECC unit is recorded in a first track of every N tracks.

In cases where a recording start is requested after a user specifies a desired recording start position, the tape having a length corresponding to the tracks of a predetermined number is rewound. Then, the ECC unit including the editing point is detected based on the header information, and recording is started from the detected editing point in the ECC unit Therefore, in Japanese patent Laid-Open No. 2004-164731, there were problems in that the time for detecting the editing point took a long time and the recording could not be started immediately.

SUMMARY OF THE INVENTION

The present invention is directed to a recording and reproducing apparatus and its method which can immediately detect a recording start position and quickly start a recording process.

In accordance with an aspect of the present invention, a recording and reproducing apparatus includes: a reproduction unit configured to reproduce information data, which is error-correcting-coded for every N tracks, from a recording medium, wherein the information data includes moving image data which is variable-length-encoded; a recording unit configured to record moving image data on the tape-shaped recording medium; a detection unit configured to detect additional information from the information data reproduced by the reproduction unit, wherein the additional information indicates that the editing point, which can be set up for every frame of a predetermined number, is contained in the moving image data recorded in the N tracks; and a controller configured to control the reproduction unit to reproduce the information data by transporting the recording medium at a high-speed faster than a normal reproduction speed and the recording unit to record new moving image data from the editing point which is determined based on the additional information which is detected from the information data reproduced by transporting the recording medium at the high-speed.

In accordance with another aspect of the present invention, a recording and reproducing method includes: a reproduction step of reproducing information data, which is error-correcting-coded for every N tracks, from a recording medium, wherein the information data includes moving image data which is variable-length-encoded; a recording step of recording moving image data on the recording medium; a detection step of detecting additional information from the information data reproduced in the reproduction step, wherein the additional information indicates that the editing point, which can be set up for every frame of a predetermined number, is contained in the moving image data recorded in the N tracks; and a controlling step of controlling a reproducing processing in the reproduction step to reproduce the information data by transporting the recording medium at a high-speed faster than a normal reproduction speed and a recording processing in the recoding step to record new moving image data from the editing point which is determined based on the additional information which is detected from the information data reproduced by transporting the recording medium at the high-speed.

Further features and advantages of the present invention will become apparent from the following description of exemplary embodiments (with reference to the attached drawings).

DESCRIPTION OF THE EMBODIMENTS

Exemplary embodiments of the invention are described in detail below with reference to the accompanying drawings. The relative layout of constitute elements exemplified in the embodiments should appropriately be changed in accordance with the arrangement and conditions of the apparatus to which the present invention is applied. The present invention is not limited to these illustrative embodiments.

First Embodiment

Figure 1:
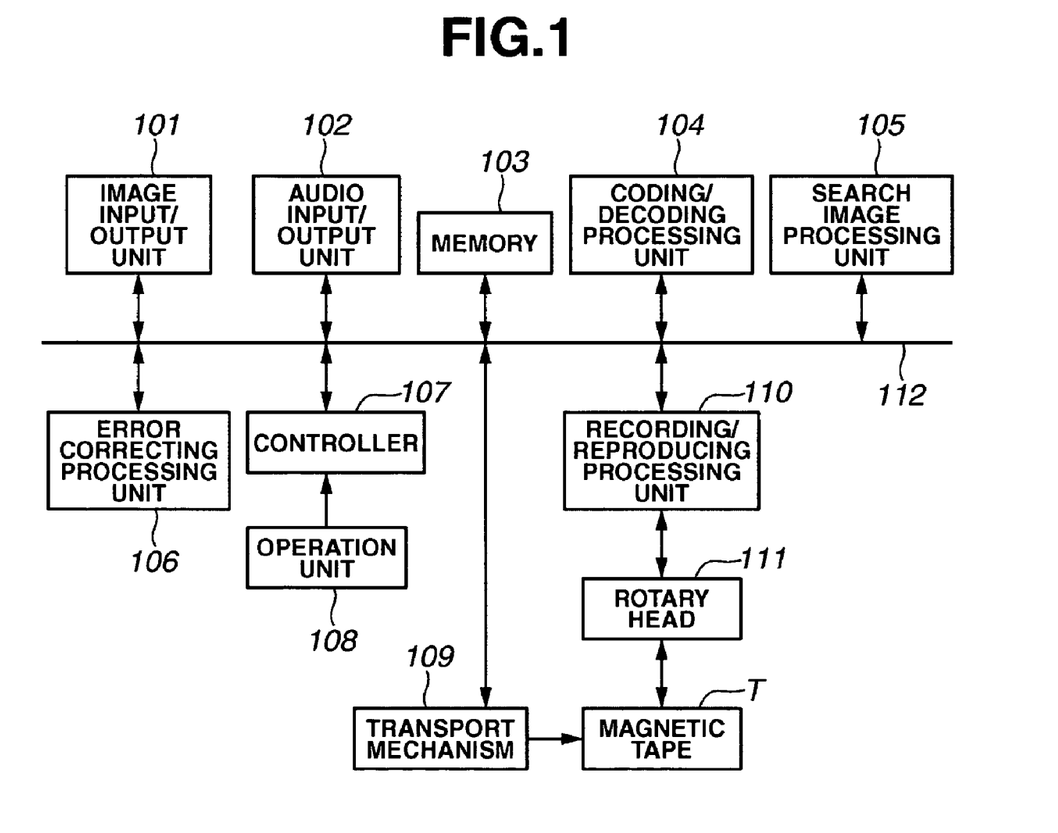
FIG. 1 is an exemplary block diagram of a VTR in one embodiment of the present invention.

FIG. 1 is an exemplary block diagram of a VTR in one embodiment of the present invention.

In FIG. 1, the VTR of this embodiment includes an image input/output unit 101 for inputting and outputting moving image data, an audio input/output unit 102 for inputting and outputting audio data, a memory 103, a coding/decoding processing unit 104 for encoding and decoding the moving image data and the audio data, a search image processing unit 105 for creating image data for a search (hereinafter referred to as "search image data") and performing a decoding process for the search image data, an error correcting processing unit 106 for performing an error-correcting-code and error-correction-decode for the image data and the audio data, a controller 107 for controlling each unit, an operation unit 108 including a power switch, a recording switch, a reproducing switch, etc., a transport mechanism 109 including a capstan for transporting a magnetic tape T, etc., a recording/reproducing processing unit 110 for recording and reproducing data for the tape T, a rotary head 111 for tracing the tape T and recoding/reproducing the data, and a data bus 112 for transmitting and receiving the data between units.

In this embodiment, the tape T is stored in a cassette (not shown), and the loading/ejecting of the cassette can be easily carried out by a cassette loading/ejecting mechanism (not shown).

Normal recording process in the VTR 100 is described below.

The moving image data inputted from the image input/output unit 101 and the audio data inputted from the audio input/output unit 102 are stored in the memory 103. The coding/decoding processing unit 104 performs encoding processing according to an MPEG (Moving Picture Experts Group) method for the moving image data and the audio data stored in the memory 103, and stores the encoded data (hereinafter referred to as "MPEG data") in the memory 103 again. The search image processing portion 105 generates the search image data for high-speed reproduction using I (intra-coded) frame data among the MPEG data stored by the memory 103, and stores the search image data in the memory 103. I frame is coded without reference to other frames.

In this embodiment, the search image data for M-fold-speed reproduction is recorded in the position corresponding to the trace of the head 111 when performing a high speed transport of the tape T at the M-fold-speed. For example, in this embodiment, two types of search image data for eight-fold-speed reproduction (M=8) and twenty-four-fold-speed reproduction (M=24) as M-fold-speed search reproduction, are generated and recorded.

The error correcting processing unit 106 performs an interleave processing for the MPEG data and the search image data, which are stored in the memory 103, with data of the N tracks (e.g., 16 tracks) formed on the tape T as one unit. Moreover, the error correcting process of the product code is performed to the interleaved data, and then the error correcting processed data is de-interleaved and stored in the memory 103. The data of every 16 tracks will be referred to as an ECC unit. The controller 107 adds additional information, which indicates whether an editing point is included in the ECC unit of the MPEG data stored in the memory 103, to a head position of a first track of one ECC unit.

Here, the editing point will be described below.

In this embodiment, one GOP (group of pictures) is formed in 15 frames units, and P (forward predictive-coded) frame is inserted every three frames. The P frame is coded more efficiently using motion compensated prediction from a past intra or predictive coded frame. In the MPEG data recorded on the tape T, the position immediately before the I frame or the P frame can be set up as the editing point. In the case of the below-described consecutive recording, the continuous MPEG data is reproducible by starting the recording of new MPEG data from the editing point.

The MPEG data recorded in this embodiment is encoded so that the data rate of the MPEG data may become constant, such as 25 Mbps, but in the MPEG method, since variable-length-coding is performed for each frame, the amount of data between frames does not become constant. Therefore, on the tape T, the position set up as an editing point is not fixed. The additional information which indicates whether the above-described editing point is included is recorded on a head position of the first track of every ECC unit. By using the additional information, the existence of the editing point is easily detectable at the time of consecutive recording.

Figure 2:
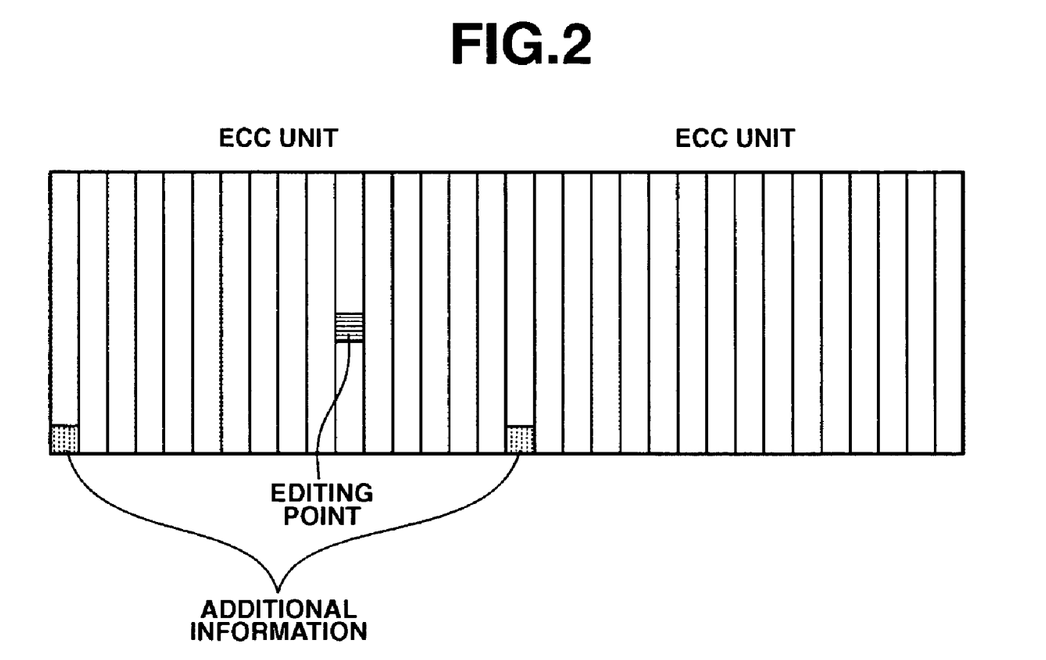
FIG. 2 illustrates an example of a recoding pattern on a magnetic tape.

FIG. 2 illustrates an example of a recoding pattern on the tape T.

As illustrated in FIG. 2, in this embodiment, the additional information which indicates whether the editing point is in the ECC unit is recorded in the head position of the first track of the ECC unit.

Figure 3:
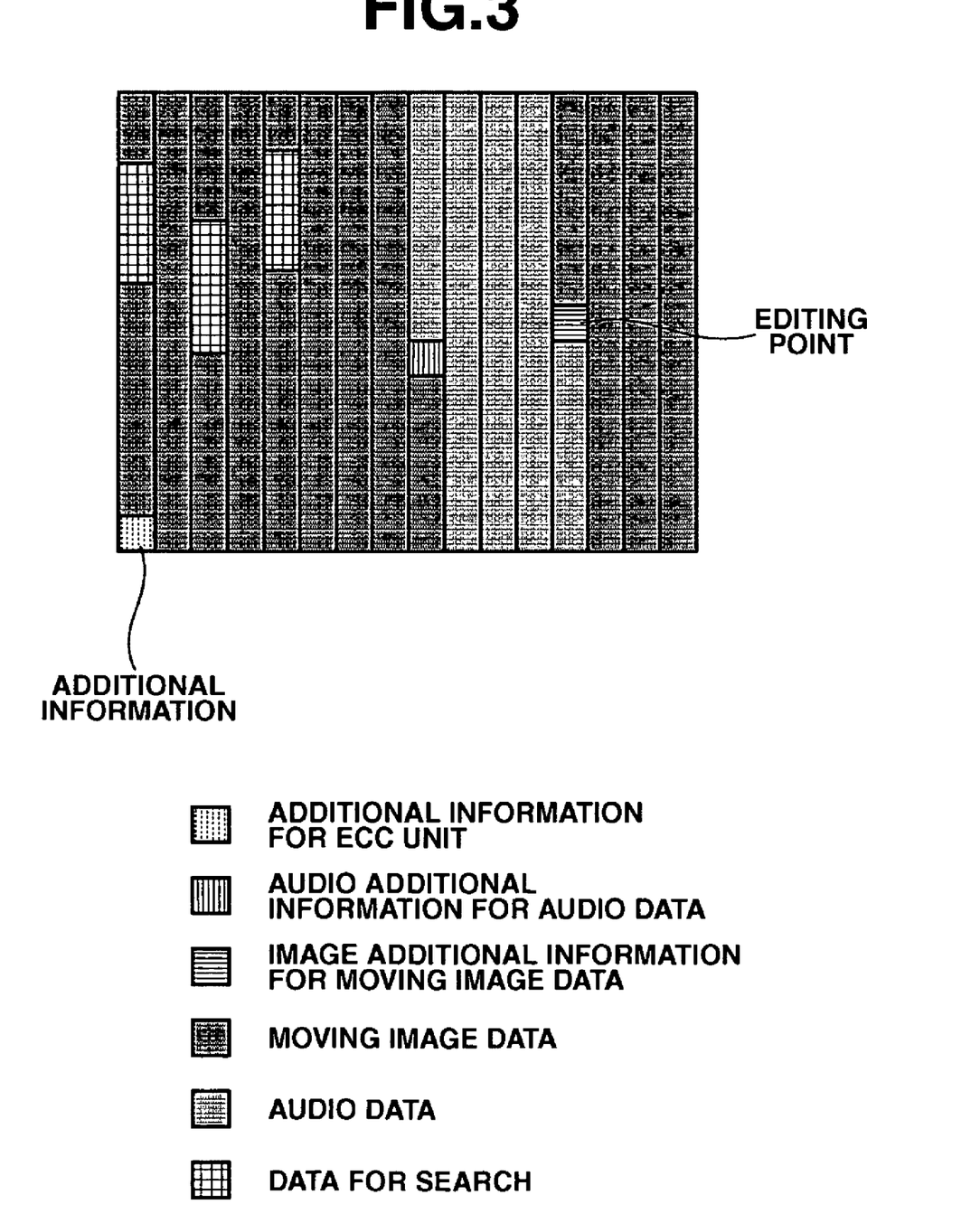
FIG. 3 illustrates an example of data of one ECC unit on the magnetic tape.

FIG. 3 illustrates an example of data recoded in one ECC unit.

In FIG. 3, the ECC unit includes the additional information for the ECC unit, encoded moving image data, search image data, audio additional information for the audio data, encoded audio data, and image additional information for the image data. As illustrated in FIG. 3, the additional information is recorded in the head position of the first track of each ECC unit. The additional information includes position information (e.g., a track number, a below-described sync-block number) of the editing point in the ECC unit besides the information which indicates whether the editing point is in the ECC unit. Furthermore, the additional information includes a DTS (decoding time stamp) of the image recorded from the editing point and a VBV (video buffer verifier) Delay value which indicates the time when the image data recorded from the editing point is kept waiting in a VBV buffer for decoding.

Figure 4:
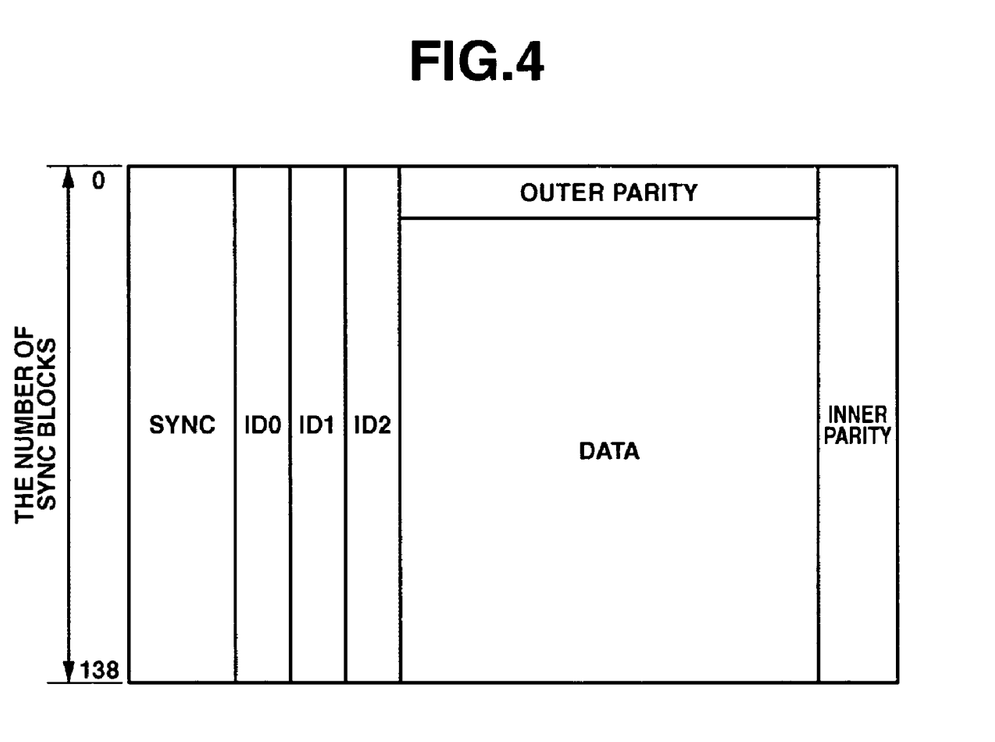
FIG. 4 illustrates a data structure of each track.

FIG. 4 illustrates a data structure of each track in FIG. 3

Each track includes the sync block from 0 to 138. Each sync block includes Sync, ID0, ID1, ID2, outer code parity, and inner code parity. Also, ID1, ID2, and ID3 include track pair number information which indicates the position of the track in the ECC unit and sync block number information which indicates the position of the sync block in the track.

By performing a digital-modulation process for the data for recording comprised as described above, the recording/reproducing process unit 110 multiplexes a pilot signal for the tracking control to the data, and sends the multiplexed data to the rotary head 111. Then, tracks are formed on the tape T by the rotary head 111, and the data is recorded in the tracks.

While recording the data, if a recording stop is directed with the operation unit 108, the controller 107 controls the transport mechanism 109 in order to stop the transportation of the tape, and the recording/reproducing process unit 110 stops recording when recording of one ECC unit is completed. That is, the recording is stopped in the unit of the ECC unit.

Next, the reproducing process will be described below.

If a reproducing start is directed with the operation unit 108, the controller 107 controls the transport mechanism 109, and transports the tape T at a normal reproduction speed, and the data recorded on the tape T is reproduced by the rotary head 111. The recording/reproducing processing unit 110 detects digital data from a signal reproduced by the rotary head 111 and writes the digital data in the memory 103. Additionally, the recording/reproducing processing unit 110 detects the pilot signal multiplexed in the reproduced data, generates a tracking error signal using the pilot signal, and sends the tracking error signal to the controller 107. The controller 107 controls the transport mechanism 109, and controls the head 111 and the tracking of the tape T.

The error correcting processing unit 106 performs an error-correcting decoding process in the unit of one ECC unit for the reproduced data stored in the memory 103, corrects an error in the reproduced data, and rewrites the corrected reproduced data in the memory 103. The coding/decoding processing unit 104 reads the data, which is error-correcting processed, from the memory 103, decodes the data, and generates the moving image data and the audio data. The decoded moving image data and audio data are again stored in the memory 103. The image input/output unit 101 and the audio input/output unit 102 read the moving image data and the audio data from the memory 103 and then output the moving image data and the audio data to an external device (e.g., display).

If search reproduction is directed with the operation unit 108, the controller 107 controls the transport mechanism 109 to transport the tape T at the eight-fold-speed. At this time, the controller 107 controls the transportation of the tape T by the transport mechanism 109 so that the rotary head 111 traces position where the search image data is recorded on the tape T. The recording/reproducing processing unit 110 writes, in the memory 103, the search image data reproduced by the head 111. The search image processing unit 105 decodes the search image data stored in the memory 103, and writes the decoded search image data in the memory 103. The image input/output unit 101 reads the search image data from the memory 103 and then outputs the search image data to the external device.

Next, the consecutive recording process in this embodiment will be described below.

Figure 5:
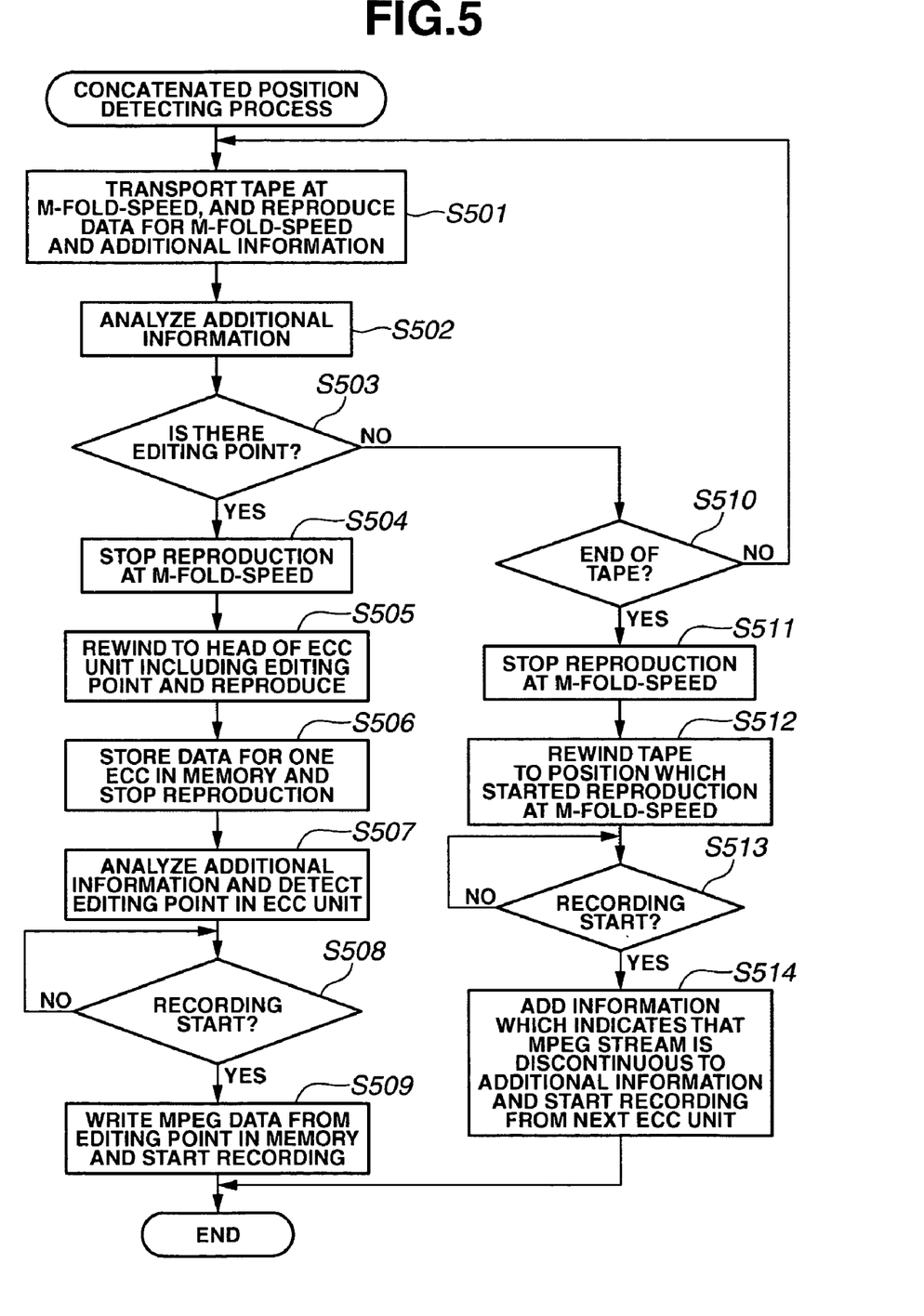
FIG. 5 is a flowchart illustrating an exemplary recording process of a consecutive-recording.

FIG. 5 is a flowchart illustrating a process performed when the apparatus is loaded with another tape T, and/or when power is supplied to the apparatus.

Figure 6:
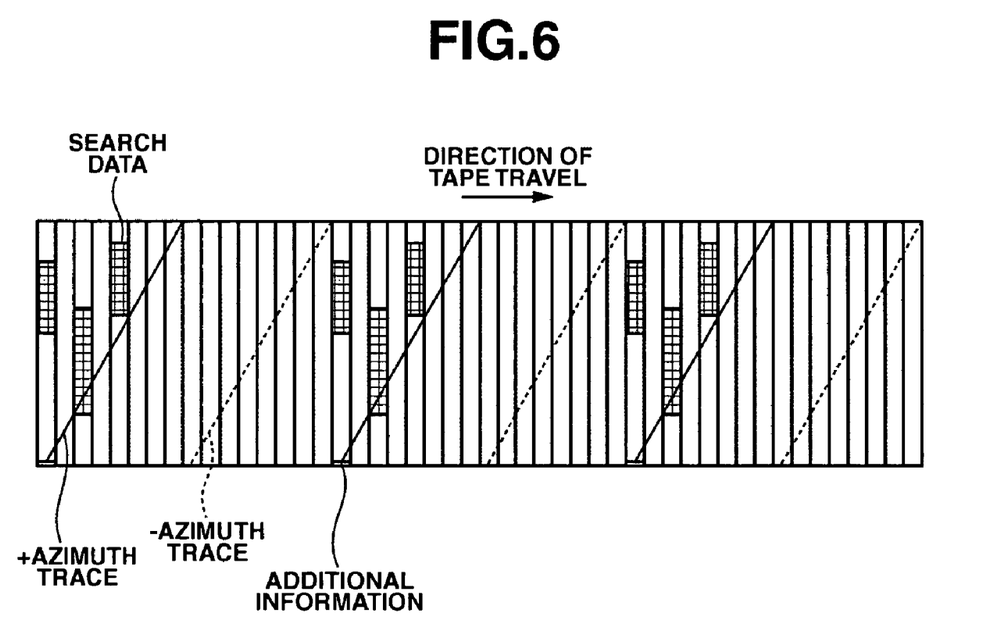
FIG. 6 illustrates a head trace in eight-fold-speed reproduction.

In FIG. 5, in step S501, after detecting the present tape position, the tape is transported to the forward direction at the M-fold-speed faster than the normal reproduction speed, and the search image data and the additional information of the ECC unit are reproduced. In this embodiment, M is eight. FIG. 6 illustrates a head trace in the eight-fold-speed reproduction.

At this time, the controller 107 controls the transportation of the tape T by the transport mechanism 109 so that the head 111 traces the position where the additional information of the ECC unit is recorded on the tape T.

Next, in step S502, the contents of the reproduced additional information are analyzed and the processing proceeds to step S503. In step S503, it is detected whether the editing point is included in the ECC unit.

If the editing point is included (yes in step S503), the processing proceeds to step S504. In step S504, the eight-fold-speed reproduction is stopped and the processing proceeds to step S505. In step S505, the tape T is rewound to the head of the ECC unit including the detected editing point, data is reproduced from the head of the ECC unit, and the processing proceeds to step S506. In step S506, the data for one ECC unit is reproduced, the reproduced data is stored in the memory 103, and the reproduction is stopped. Then, the tape T is rewound the length corresponding to the tracks required for tracking in addition to the tracks required to return to the first track of the ECC unit, and the tape T is stopped again. The processing proceeds to step S507. In step S507, the additional information of the ECC unit is analyzed, and the track number of the editing point in the ECC unit, the sync-block number, the DTS, a PTS (presentation time stamp), and the buffer amount of VBV buffer are detected. At this time, the error-correcting decoding process has been performed for the reproduced data of the ECC unit.

Next, in step S508, it is determined whether recording start is directed. If the recording start is not directed (no in step S508), this processing is repeated. If the recording start is directed (yes in step S508), the processing proceeds to step S509. In step S509, the recording is started, after writing new data in the memory 103 from the editing point in the ECC unit and performing the error-correcting coding process. The processing then ends.

In step S503, if the editing point is included (no in step S503), the processing proceeds to step S510. In step S510, it is determined whether the tape T has been transported to the end of the tape. If the tape T has not been transported to the end of the tape (no in step S510), the processing returns to step S501. If the tape T has been transported to the end of the tape (yes in step S510), the processing proceeds to step S511. In step S511, the eight-fold-speed reproduction is stopped, and the processing proceeds to step S512. In step S512, the tape T is rewound to the tape position which started the eight-fold-speed reproduction, and the processing proceeds to step S513. In step S513, it is determined whether the recording start is directed. If the recording start is not directed (no in step S513), this processing is repeated. If the recording start is directed (yes in step S513), the processing proceeds to step S514. In step S514, the transportation of the tape T is started, and information which indicates that the MPEG data is discontinuous is stored in the additional information of the ECC unit. Then, recording of new MPEG data is started from next ECC unit. The processing then ends.

Thus, according to this embodiment, when power is supplied and/or when loading another tape, the eight-fold-speed reproduction is performed from the present tape position, the additional information of the ECC unit is reproduced, and the editing point is searched by the additional information. Therefore, the editing point is detected quickly, and the consecutive recording can be performed quickly.

In this embodiment, each ECC unit includes 16 tracks, and data for the eight-fold-speed reproduction as the search image data is recorded. Therefore, the editing point is detectable with the search image for the eight-fold-speed reproduction.

Although, the additional information of the ECC unit is reproduced at the eight-fold-speed and the editing point is detected in this embodiment, it is not limited to that. The additional information may be reproduced at four-fold-speed. The trace of the head 111 in this case is illustrated in FIG. 7.

Figure 7:
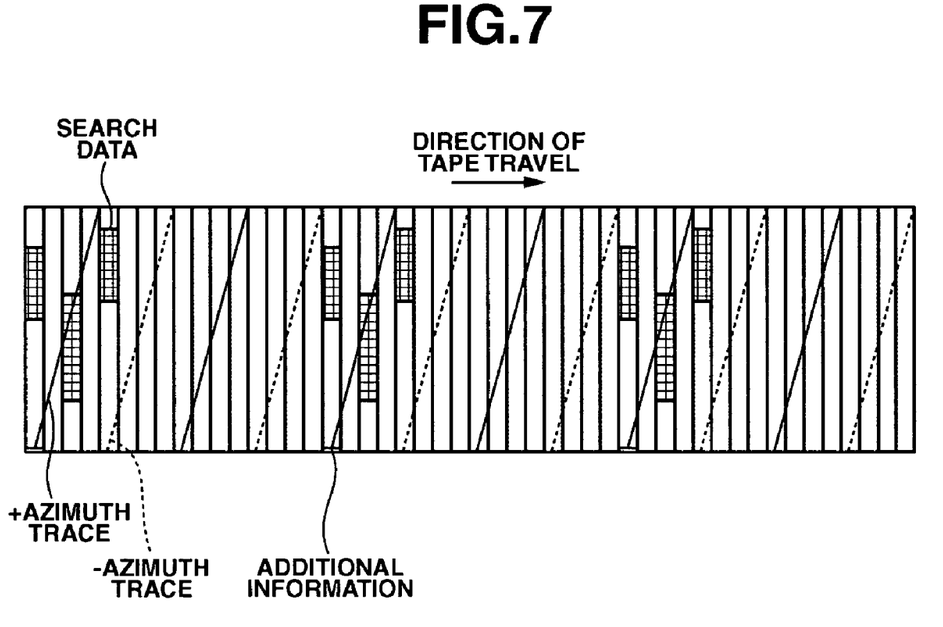
FIG. 7 illustrates a head trace in four-fold-speed reproduction.

As illustrated in FIG. 7, the image data for the search at eight-fold-speed is reproducible, tracing the recording position of the additional information of the ECC unit at the time of reproduction at the four-fold-speed.

Although the case where the additional information is detected is explained by the flow of FIG. 5, it is not limited to that. For example, the additional information of the ECC unit may be reproduced by transporting the tape from the present tape position to a reverse direction Other Embodiments The present invention can be applied to an apparatus consisting of a single device or to a system including a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code.

In this case, so long as the system or apparatus has the functions of the program, the program may be executed in any form, such as object code, a program executed by an interpreter, or script data supplied to an operating system (OS).

Examples of storage media that can be used for supplying the program include a floppy disk, a hard disk, an optical disk, a magneto-optical disk, a CD-ROM (compact disk-ROM), a CD-R (CD-recordable), a CD-RW (CD-rewritable), a magnetic tape, a non-volatile type memory card, a ROM, a DVD (digital versatile disk, e.g., a DVD-ROM and a DVD-R), and a Blu-ray Disc.

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server may download, to multiple users, the program files that implement the functions of the present invention by computer.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information to install the program in the user computer.

Besides the cases where the aforementioned functions according to the embodiments are implemented by executing the read program by computer and an operating system or the like running on the computer may perform all or a part of the actual processing so that the functions of the foregoing embodiments can be implemented by this processing.

After the program is read from the storage medium it can be written to a function expansion board inserted into the computer or to a memory provided in a function expansion unit connected to the computer. A central processing unit (CPU) or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims the benefit of Japanese Patent Application No. 2004-369428, filed Dec. 21, 2004, which is hereby incorporated by reference herein.

What is claimed is:

1. A recording and reproducing apparatus comprising:
    an encoding unit configured to encode moving image data in accordance with MPEG system which uses intra-frame encoding and inter-frame encoding and outputs encoded moving image data, where an intra-frame encoded frame is provided every 15 frames and a predictive inter-frame encoded frame is provided every three (3) frames in the encoded moving image data;
    a recording and reproducing unit configured to record the encoded moving image data on a magnetic tape where a plurality of tracks are formed, and reproduce the encoded moving image data from the magnetic tape,
    the recording and reproducing unit including a mechanism configured to move the magnetic tape,
    the recording and reproducing unit performing an error-correction-coding on the encoded moving image data for every ECC unit including a predetermined number of tracks and recording the error-correction-coded moving image data on the magnetic tape,
    the recording and reproducing unit recording on a head track of each ECC unit additional information indicating whether the intra-frame encoded frame or the predictive inter-frame encoded frame is included in the ECC unit; and
    a controller configured to determine a recording start position in a new loaded magnetic tape and control the recording and reproducing unit so as to start to record the encoded moving image data from the recording start position,
    wherein the controller, if the new magnetic tape where the encoded moving image data is already recorded is loaded, controls the recording and reproducing unit so as to move the magnetic tape at a high-speed faster than a normal reproduction speed and reproduce the additional information recorded on the head track of each ECC unit, and detects the ECC unit including the intra-frame encoded frame or the predictive inter-frame encoded frame based on the detected additional information, and
    wherein the controller controls the recording and reproducing unit so as to start to record new encoded moving image data from the track where the encoded moving image data of the intra-frame encoded frame or the predictive inter-frame encoded frame included in the detected ECC unit is recorded.

2. The recording and reproducing apparatus according to claim 1,
    wherein if the ECC unit including the intra-frame encoded frame or the predictive inter-frame encoded frame is not detected by the time the magnetic tape is moved to the end, the controller controls the recording and reproducing unit so as to start to record the new encoded moving image data from a next track of the ECC unit from which the high-speed moving is started.

3. The recording and reproducing apparatus according to claim 2, wherein if the ECC unit including the intra-frame encoded frame or the predictive inter-frame encoded frame is not detected, the controller controls the recording and reproducing unit so as to record the additional information including information indicating the recorded moving image data is discontinuous on the head track of the ECC unit from which the new encoded moving image data is recorded.

4. The recording and reproducing apparatus according to claim 1, further comprising:
    a memory configured to store the encoded moving image data reproduced by the recording and reproducing unit,
    wherein the controller controls the recording and reproducing unit so as to stop reproducing the encoded moving image data after storing the moving image data of the ECC unit including the intra-frame encoded frame or the predictive inter-frame encoded frame in the memory.

5. The recording and reproducing apparatus according to claim 4, wherein the recording and reproducing unit overwrites the new encoded moving image data from the intra-frame encoded frame or the predictive inter-frame encoded frame in the encoded moving image data of the ECC unit stored in the memory, reads the encoded moving image data from the memory, and records the read moving image data on the magnetic tape.

6. The recording and reproducing apparatus according to claim 1, wherein the controller controls the moving speed of the magnetic tape so that the recording and reproducing unit is able to reproduce the additional information.

* * * * *